(12) United States Patent
Delmas et al.

(10) Patent No.: US 7,812,949 B2
(45) Date of Patent: Oct. 12, 2010

(54) SPECTROMETER WITH CYLINDRICAL LENS FOR ASTIGMATISM CORRECTION AND DEMAGNIFICATION

(75) Inventors: Remy Delmas, Mennecy (FR); Francois Baratange, Edison, NJ (US)

(73) Assignee: Horiba Jobin Yvon Inc., Edison, NJ (US)

( * ) Notice: Subject to any disclaimer, the term of this patent is extended or adjusted under 35 U.S.C. 154(b) by 332 days.

(21) Appl. No.: 11/975,052

(22) Filed: Oct. 17, 2007

(65) Prior Publication Data

US 2009/0103088 A1      Apr. 23, 2009

(51) Int. Cl.
*G01J 3/28* (2006.01)
(52) U.S. Cl. .................................. 356/326; 356/328
(58) Field of Classification Search .......... 356/326–334
See application file for complete search history.

(56) References Cited

U.S. PATENT DOCUMENTS

| | | | |
|---|---|---|---|
| 4,983,039 A * | 1/1991 | Harada et al. | 356/328 |
| 5,496,993 A | 3/1996 | Kasuga | |
| 5,562,334 A * | 10/1996 | Wortel | 353/69 |
| 6,184,985 B1 * | 2/2001 | Chalmers et al. | 356/305 |
| 6,628,383 B1 * | 9/2003 | Hilliard | 356/305 |
| 6,870,619 B1 * | 3/2005 | Tenhunen et al. | 356/330 |
| 6,989,898 B2 | 1/2006 | Hopler et al. | |
| 6,992,843 B2 | 1/2006 | Juhala | |
| 7,102,746 B2 | 9/2006 | Zhao | |
| 7,330,258 B2 * | 2/2008 | Warren | 356/328 |
| 7,605,917 B2 * | 10/2009 | Teichmann et al. | 356/326 |
| 2001/0048526 A1 * | 12/2001 | Bender | 356/328 |
| 2002/0001079 A1 | 1/2002 | Paolinetti et al. | |
| 2006/0159395 A1 | 7/2006 | Hnatiw et al. | |

FOREIGN PATENT DOCUMENTS

WO      2007014708 A2      2/2007

OTHER PUBLICATIONS

Spectrometers; OceanOptics.com, pp. 12-29 (undated, but at least as early as Sep. 2007.).
Diffraction Gratings; Jobin Yvon Horiba, HoribaGroup; www.jobinyvon.com; pp. 1-20 (undated, but at least as early as Sep. 2007.).
Monchromators & Spectrographs; Horiba Jobin Yvon; www.jobinyvon.com; Sep. 10, 2007, pp. 1-18.
Stratt, Compensation of Astigmatic Errors in a Grating Spectrograph, Journal of the Optical Society of America, vol. 43, No. 7, Jul. 1953, pp. 593-594.
Foreman, Lens Correction of Astigmatism in a Czerny-Turner Spectrograph, Applied Optics, vol. 7, No. 6, Jun. 1968, pp. 1053-1059.
European Search Report filed in EP 08305701, Nov. 11, 2009.

\* cited by examiner

*Primary Examiner*—L. G Lauchman
(74) *Attorney, Agent, or Firm*—Brooks Kushman P.C.

(57) ABSTRACT

A spectrometer which in one embodiment including a dispersive element and a concave element. The dispersive element may be a flat or concave grating which receives light and reflects the light in different collimated wavelengths. The concave element being located downstream from the dispersive element and arranged to reflect and focus the light toward a detector. The reflected light from the concave element including astigmatism. A cylindrical lens positioned between the concave element and the detector and configured to simultaneously correct the astigmatism and demagnify the light across the detector. In one embodiment the cylindrical lens varies in thickness progressively along its length.

20 Claims, 7 Drawing Sheets

SPECTROMETER WITH CYLINDRICAL LENS FOR ASTIGMATISM CORRECTION AND DEMAGNIFICATION

FIELD OF THE INVENTION

The present invention relates to spectrometers and, more particularly to an improved spectrometer that is designed to correct for astigmatisms in a dispersed light beam while demagnifying the image onto the multichannel detector.

BACKGROUND

A spectrometer is an optical instrument that is used to measure properties of light, such as intensity, as a function of wavelength. Spectrometers are most often used in spectroscopic analysis to identify specific materials. By analyzing an object's light, physical properties of that object, such as temperature, mass, luminosity and composition, can be determined. Presently commercially available spectrometers typically combine a dispersive element, such as a diffraction grating, to separate a light beam into different component wavelengths, and one or more curved elements (reflective mirrors or lenses) that collimate and image the light from the dispersive element onto an elongated detector, such as a photosensor. The optical geometry of the system controls the size and shape of the light that is imaged onto the detector relative to its size and shape upon entry into the spectrometer. Light of different wavelengths is spread apart along the length of the detector.

One example of a currently available spectrometer is the Czerny-Turner spectrometer, which comprises a flat diffraction grating located between two spherically-curved concave mirrors. The first mirror collimates light from the entry spot onto the grating. The second mirror focuses light from the grating onto a detector, which in currently available spectrometers is typically a linear array of CCDs or other electronic light-sensors. The current spectrometers generally are either a "regular" Czerny-Turner spectrometer, in which the light is directed within the spectrometer housing along a generally M-shaped optical path, or a "crossed" Czerny-Turner spectrometer, in which the light is directed within the spectrometer such that it crosses over itself between the entry point and the detector..

In order to reflect the light beam within the housing, the curved mirrors are set off axis from the central ray of the light beam. This produces astigmatism in the reflected light beam. As a result, each color of light focuses to a line, rather than a spot. If the second mirror and the detector array are aligned for maximum resolution along the array, the line of light that results has a significant height perpendicular to the length of the array. If the height of the line of light is greater than the height of the sensors, the excess light is wasted and the sensitivity of the spectrometer is reduced.

To correct for such astigmatisms, one solution has been to modify a Czerny-Turner spectrometer to include a cylindrical lens extending along the detector array that will correct for the astigmatism and focus the line of light into a spot. A conventional cylindrical lens is designed to focus light much more strongly in one direction than in a perpendicular direction. Thus, it is used to focus the off-axis light onto the detector. It is even possible to use cylindrical lenses to simultaneously demagnify the light onto a detector array so as to focus the light on a narrower spot than the height of the detector that would otherwise result. However, it has been found that presently available cylindrical lenses focus the light perfectly at only one point along the array. That is, they are configured to optimize only one wavelength of light, typically at the center of the detector. Thus, conventional cylindrical lenses, while adjusting for some astigmatism, are not designed to correct astigmatism across substantially the entire spectrum and don't effectively demagnify across the full spectrum due to the astigmatism not being corrected fully as you move further away from the center.

The inventors also determined that no demagnification can be achieved without the presence of astigmatism. The only exception being a very limited demagnification can be achieved in a spectrometer as the result of using different arm lengths for the entrance and exit focal lengths. For example, a spectrometer with 100 mm input focal length and 75 mm output focal length demagnifies by ¾.

In the case of a Czerny-Turner spectrometer with corrected astigmatism (using an asphere/toroid focusing mirror, for example) or a concave aberration corrected grating spectrometer, the lack of astigmatism prevents the addition of a cylindrical lens for achieving demagnification. The inventors investigated various types of spectrometers that include astigmatism, and found that adding wedge cylindrical lenses simultaneously eliminates the astigmatism and induces demagnification across the full spectrum.

Current cylindrical lens corrections have been limited to use in Czerny-Turner type spectrometers since other types of spectrometers, such as concave grating spectrometers, correct the astigmatism with the grating and, therefore a cylindrical lens is not needed.

SUMMARY

According to one embodiment of the invention, there is provided a spectrometer comprising a dispersive element for dispersing light from a light source, a concave element arranged to focus light dispersed by the dispersive element onto an elongated detector so that the light is dispersed in a direction along a length direction of the detector, wherein the light is not fully focused by the concave element at the detector in a direction perpendicular to the length direction of the detector, and a wedge or tapered cylindrical lens that varies in geometry progressively along its length, the wedge-shaped cylindrical lens located so as to extend along at least a portion of the length direction of the detector between the concave lens and the detector.

According to another embodiment of the invention, there is provided a spectrometer comprising a concave dispersive element arranged to focus light onto an elongated detector so that the light is spectrally dispersed in a direction along a length direction of the detector, wherein the light is not fully focused at the detector by the concave element in a direction perpendicular to the length direction of the detector, and a cylindrical lens extending along the length direction of the detector focusing the light at the detector in the direction perpendicular to the length direction of the detector.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE DRAWINGS

Reference will now be made in detail to various embodiments of the present invention, examples of which are illustrated in the accompanying drawings. The embodiments are described by way of explanation, and not by way of limitation.

Figure 1:
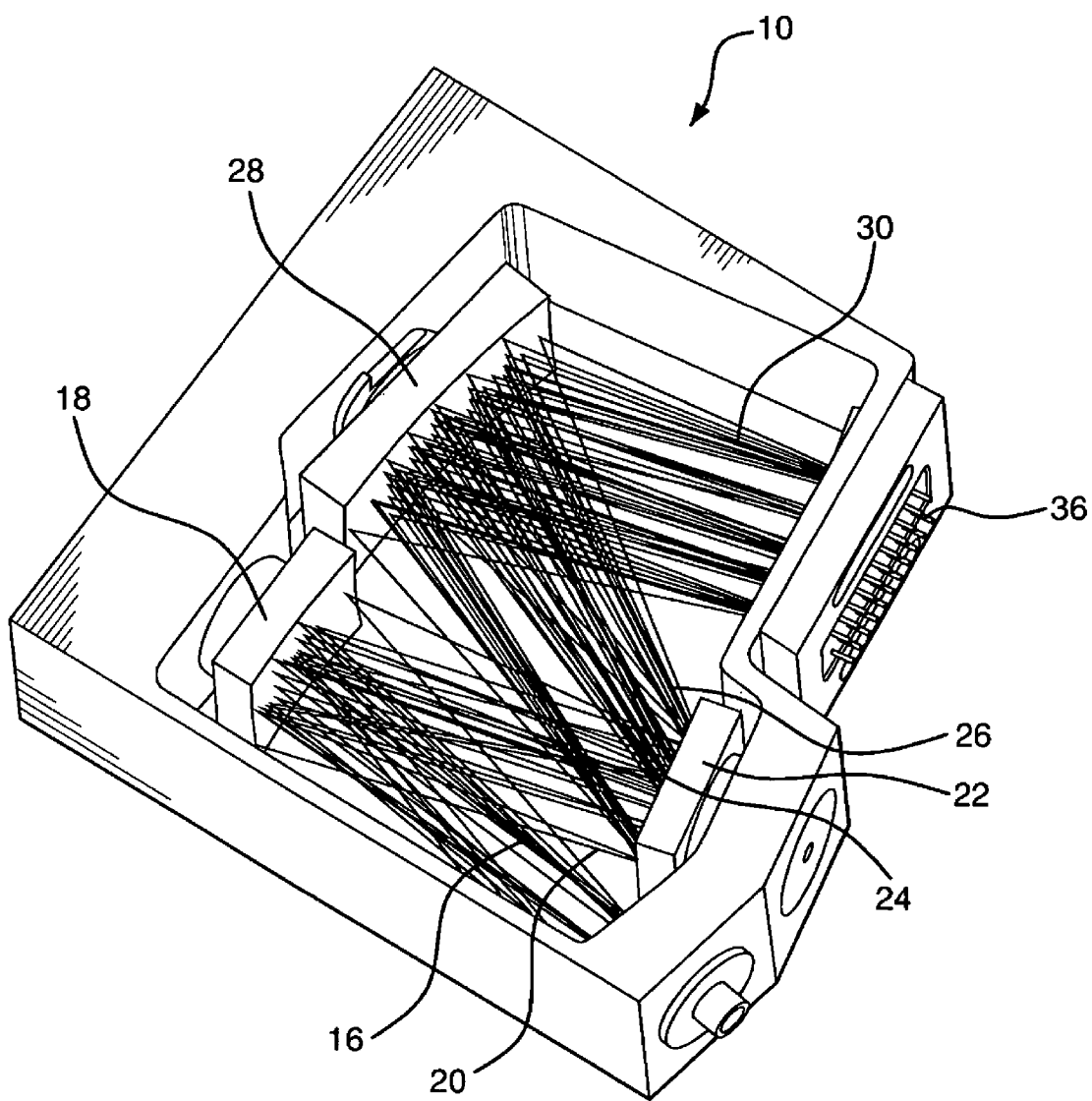
FIG. 1 is a perspective view of a first embodiment of a spectrometer.
Figure 1A:
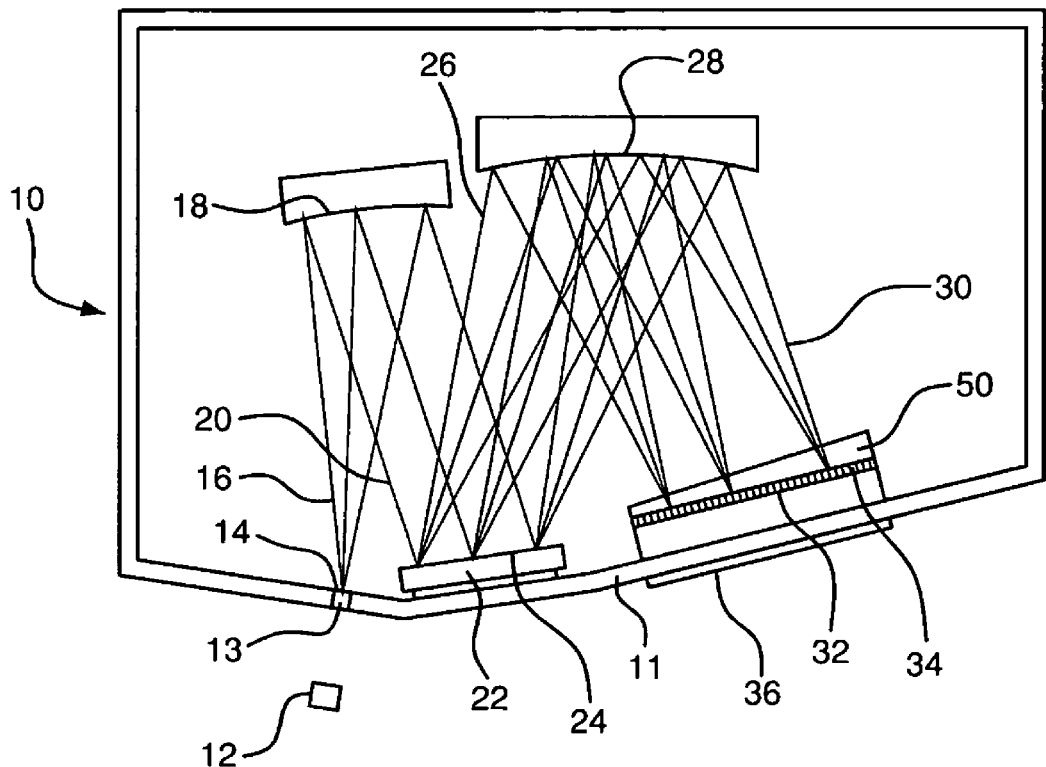
FIG. 1A is a diagrammatic view of the spectrometer of FIG. 1.

Referring initially to FIGS. 1 and 1A, one embodiment of a spectrometer is indicated generally by the reference numeral 10. The spectrometer 10 is for use in analyzing light from a light source 12, which may be an external light. The light source may be delivered from an end of an optical fiber cable delivering light to the spectrometer 10. The spectrometer includes a housing 11 with an entry aperture or window 13 for receiving the light. The entry aperture or window 13 in the housing may be in the form of a hole or slit or the fiber bundle itself. The light is presented to the spectrometer generally in the form of a luminous entry spot or disk 14. It should be readily apparent that the light can be generated from any source which may comprise parts of or the entire spectrum.

The light from the source 12 enters the housing as an entry beam 16 which diverges from the entry spot 14 toward a concave, spherically curved collimating mirror 18. The collimating mirror 18 redirects the light as a substantially collimated beam 20, as shown in FIGS. 1 and 1A, onto a diffraction grating 22. The diffraction grating 22 is flat and formed with straight, parallel, evenly spaced grooves 24. Such diffraction gratings are well known in the art and are available from a number of sources, such as a Type I plane gratings sold by Horiba Jobin Yvon, Edison, N.J. The diffraction grating 22 reflects and disperses the light 20 into different colors of the spectrum. This is illustrated by the dispersed beams 26 in FIGS. 1 and 1A. The beams 26 are substantially collimated as they are reflected off the grating. The dispersed beams 26 are directed (reflected) onto a concave focusing mirror 28.

The focusing mirror 28 focuses the light beams 26 into an exit beam 30 which is directed toward a detector 32. The detector 32 is preferably a linear CCD array or photodiode array (PDA) (e.g., Si, InGaAs) of sensors 34 that, through readout electronics not shown in detail, provide an electrical output at a data port 36. The sensors 34 and the readout electronics connecting them to the data port 36 are conventional and, in the interests of conciseness, are not shown or described in detail. As is shown in FIGS. 1 and 1A, each color of light is focused at a different spot along the length of the detector array 32. The size of the spot imaged on the CCD or PDA for a particular wavelength of light is a function of the size of the entry spot 14 and the ratios of various geometries of the optical components and their placement in the optical system. The size of the image spot measured along the detector array 32 determines the spectral resolution of the spectrometer, and the spectrometer is usually focused for maximum spectral resolution.

However, because the light beams 16, 20 and 26, 30 reflect off the curved mirrors 18, 28 off-axis, the effective focal length of the mirrors 18, 28 in the "tangential" or "meridional" plane of the drawing in FIG. 1A is shorter than the effective focal length of the mirrors in the "sagittal" plane perpendicular to the plane of the drawing producing astigmatism in the light beam. As a result, when the image spot is focused in the meridional plane, to increase resolution as previously described, it is not perfectly focused in the sagittal plane by the focusing mirror 28. The consequence is that the light beams 30 form a line of light of each wavelength on the detector perpendicular to the plane of FIG. 1A, rather than into a spot. If the line of light is larger than the height of a sensor (pixel) 34, the excess light is lost and the sensitivity of the spectrometer is reduced.

To correct the focusing of the beam 30, a cylindrical lens 50 is positioned between the focusing mirror 28 and the detector array 32. More specifically, and with reference to FIG. 2, a cylindrical lens 50 is preferably positioned in front of the detector array 32. The lens 50 has a curved face 52 and an opposite flat face 54. The curved face or surface 52 is substantially cylindrical in shape and preferably defines a portion of a right circular cylinder. As is apparent from FIGS. 2 and 2A, although the lens is referred to as a cylindrical lens, the lens actually has the shape of only a portion of a cylinder. The lens 50 focuses the light in the beam 30 in the sagittal plane, without appreciably affecting the focusing in the meridional plane.

In the illustrated embodiment, the flat face 54 of the lens is oblique to the longitudinal axis 51 of the cylinder so as to form the cylindrical lens into wedge or taper. As such, lens 50 is thicker at one end than at the other. Because of the geometry of the optical system, the amount of correction for astigmatism needed varies along the length of the detector array 32. The wedge shape of lens 50 provides a corresponding correction that varies with the thickness of the wedge over the entire length of the detector.

Figure 2:
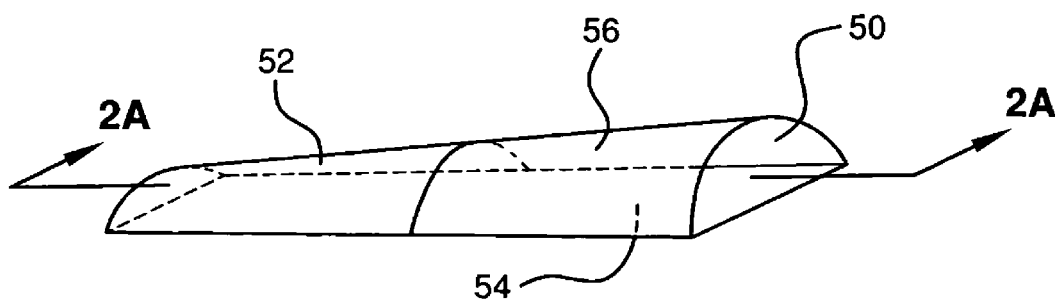
FIG. 2 is a perspective view of a lens used in the spectrometer of FIG. 1.
Figure 2A:
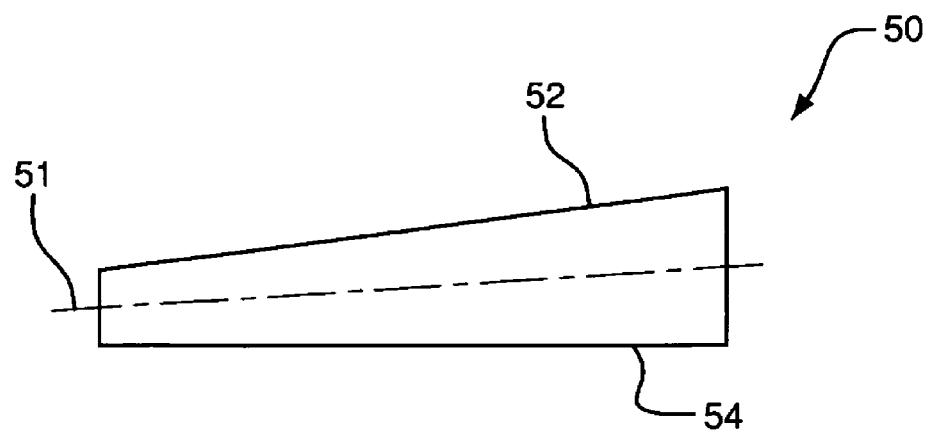
FIG. 2A is a cross-sectional view of the cylindrical lens of FIG. 2.

In addition to correcting the astigmatism substantially uniformly along the entire length of the detector array 32, the lens 50 shown in FIGS. 2 and 2A also "demagnifies" the spot image at the sagittal focus of the exit beam 30 to a height narrower than the height of the initial image at the entry spot 14. For example, in one embodiment, it is possible to focus the light from a 600 μm diameter entry spot 14 onto an array 32 of 200 μm height CCD/PDA pixels. Demagnification by a ratio of 2:1 to 3:1 is achievable with the cylindrical lens, using the astigmatism that naturally arises in an otherwise standard regular or crossed Czerny-Turner spectrometer.

The longer-wavelength end of the cylindrical lens 50 may optionally be coated on either face with a long-pass filter coating selected to block multiple order diffracted light of shorter wavelengths. This may be used in spectrometers operating at wavelength ranges that generate second order or higher order wavelengths. For example, for a spectrometer that covers a wavelength range between 200-500 nm, a long pass filter would not be needed for wavelengths that fall between 200-400 nm. However, starting at 400 nm, the wavelength will be a mix of first order light, e.g., 410 nm, and second order light, e.g., 205 nm (half wavelength). In such a case, a coating may optionally be added as part of the cylindrical lens as a filter that permits the long wavelength, e.g., 410 nm, to pass through while blocking the short wavelength, e.g., 205 nm portion. Thus, only pure 405 nm light will pass through.

The focusing mirror 28 shown in FIGS. 1 and 1A may be either a spherically curved mirror or an aspheric mirror. Where the mirror 28 is spherically curved, the lens 50 corrects the astigmatism that naturally results and also demagnifies the light as discussed above. Where the mirror 28 is aspherically curved, the mirror 28 is designed to reduce the astigmatism, but not totally eliminate it. The remaining astigmatism will then be fully eliminated by a cylindrical lens 50 and will permit demagnification to take place.

In an alternative form of the first embodiment of spectrometer 10, the location of the entry window 13 and the detector array 32 may be changed, with corresponding adjustments to the alignment of the mirrors 18, 28, so that the entry beam 16 and the exit beam 30 cross each other and beams 20, 26 to form a configuration similar to that of a "crossed" Czerny-Turner spectrometer. This is shown schematically in FIGS. 4 and 4A. In another alternative form of the first embodiment of spectrometer 10, the two mirrors 18, 28 may be formed as part of the surface of a single spherically curved mirror.

Figure 3:
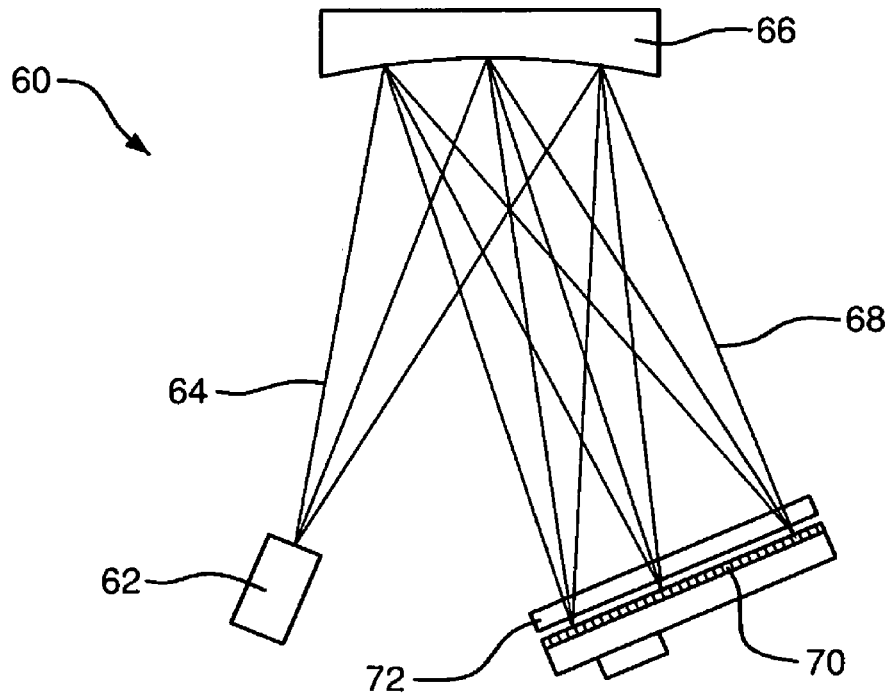
FIG. 3 is a diagrammatic view of a second embodiment of a spectrometer.

Referring now to FIG. 3, a second embodiment of spectrometer is shown and generally designated by the reference numeral 60. In this embodiment, a light from a light source 62 forms a diverging entry beam 64 which is directed onto a concave diffraction grating 66. The concave diffraction grating 66 disperses the light into exit beams 68 of different colors, and at the same time focuses the colored exit beams onto a detector array 70. A cylindrical lens 72 is positioned in front of the detector array 70. Similar to the spectrometer 10 in FIG. 1, the light of different colors is dispersed in the meridional plane along the detector array 70, while light of the same color is focused in the sagittal plane.

The grating 66 is preferably a holographically recorded grating. The grating 66 may have equidistantly spaced grooves, in which case it will produce astigmatism. Alternatively, the grating 66 may have non-uniform groove spacing, as described in commonly-assigned U.S. Pat. No. 3,628,849, which is incorporated herein by reference in its entirety. This patent describes an aberration corrected holographically recorded grating. The non-uniform spacing substantially cancels out the astigmatism in the system. One such type grating is a Type IV aberration-corrected holographic grating sold by Horiba Jobin Yvon, Edison, N.J. In the grating 66 of the present invention, the grating is designed to still produce astigmatism, either by selecting a grating for which the non-uniformity of the groove spacing does not match the angle of incidence and diffraction of the beams 64, 68 or by calculating the non-uniformity so as to under-correct for the astigmatism, i.e., inject "controlled" astigmatism that will then be fully eliminated by a cylindrical lens and will permit demagnification to take place. Accordingly, the light beams 68 still contain astigmatism.

In the embodiment shown in FIG. 3, the lens 72 may be a cylindrical wedge lens 50 as shown in FIG. 2, or a cylindrical lens that is uniform along its length. If the cylindrical lens 72 is uniform in shape, it may be adjusted for optimum correction of astigmatism, and demagnification if desired, at a single point, for example at the center of the lens, with over-correction of astigmatism at one end and under-correction at the other end, taking into account the focal length and the distance from lens to detector.

It is also contemplated that an order-sorting filter may be applied to the cylindrical lens 72 as a coating deposited on a portion or all of the curved face of the cylindrical lens 72, or deposited on its flat face. Conventional order-sorting filters are separate optical elements positioned before a CCD to eliminate multiple order light reflections. In the present invention, the order-sorting filter is a coating that is applied to some or all of a surface of the cylindrical lens (either the curved surface or the flat face). Thus, the coating eliminates the multiple order wavelengths either as they enter the cylindrical lens or as they leave. The coating is composed of multiple thin layers of dielectric material forming an interference filter. Those skilled in the art would be readily capable of selecting the appropriate material to form the order-sorting filter. In a CCD/PDA spectrometer, if an order sorting filter is used, it is beneficial to include a no-window detector to avoid extra distance that would otherwise be needed.

Figure 4:
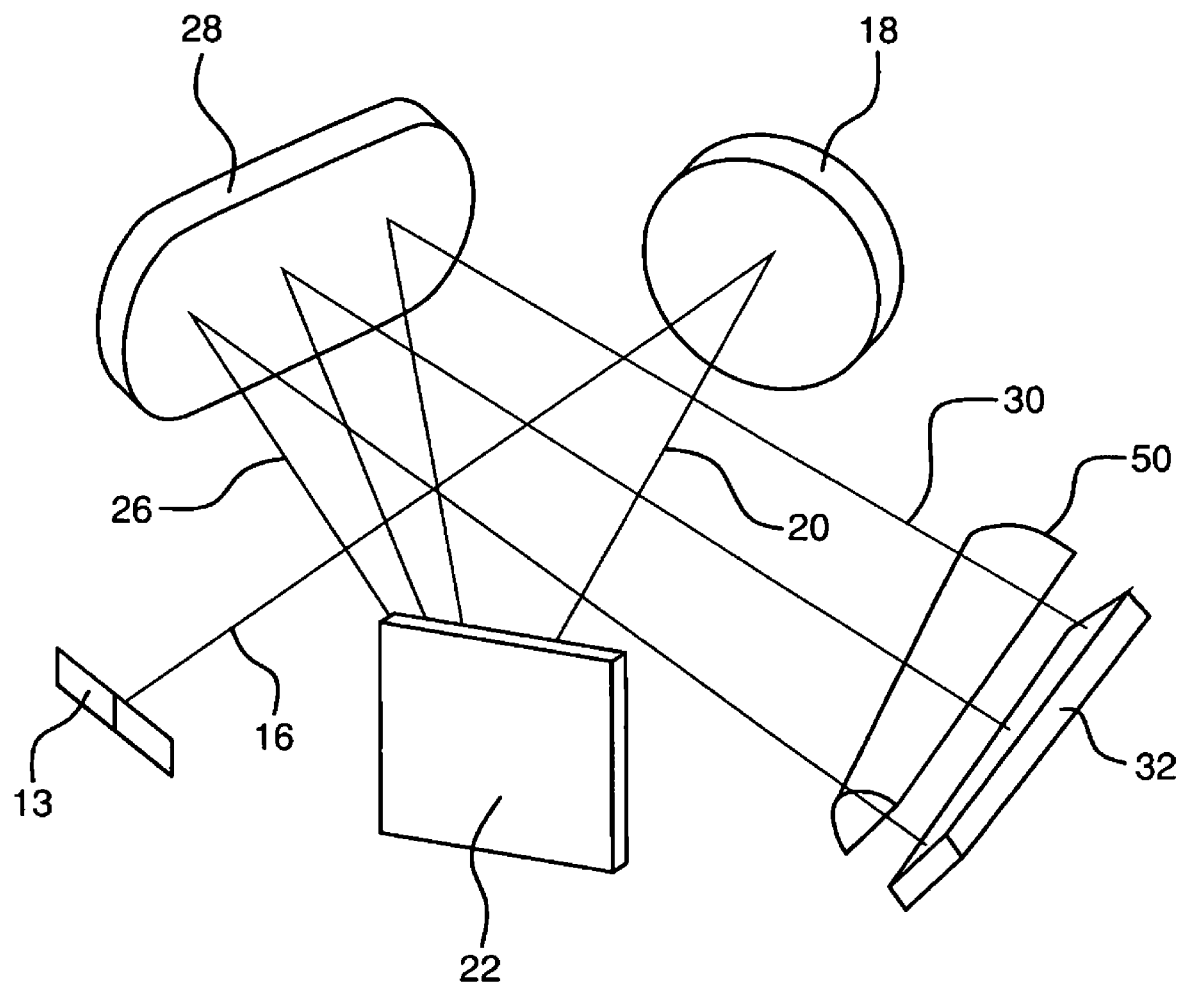
FIG. 4 is a perspective view of a third embodiment of a spectrometer.
Figure 4A:
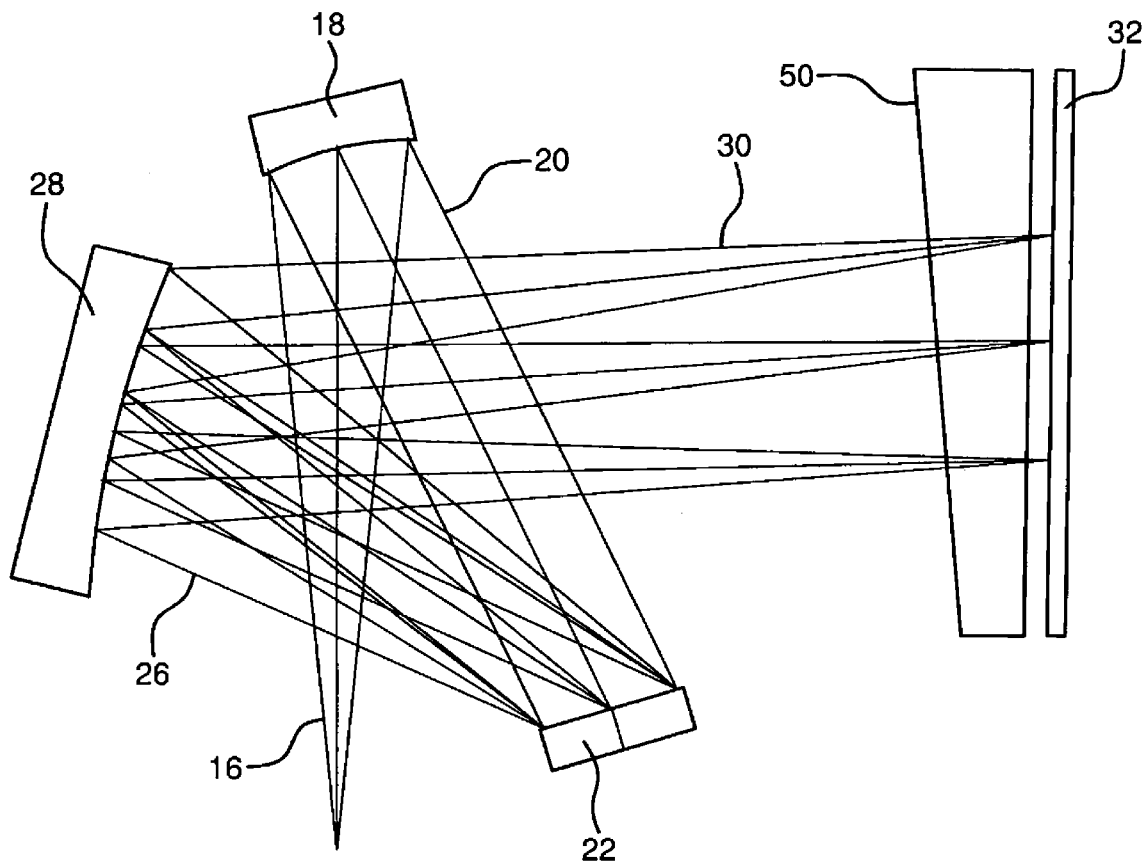
FIG. 4A is a diagrammatic view of the spectrometer of FIG. 4.
Figure 5:
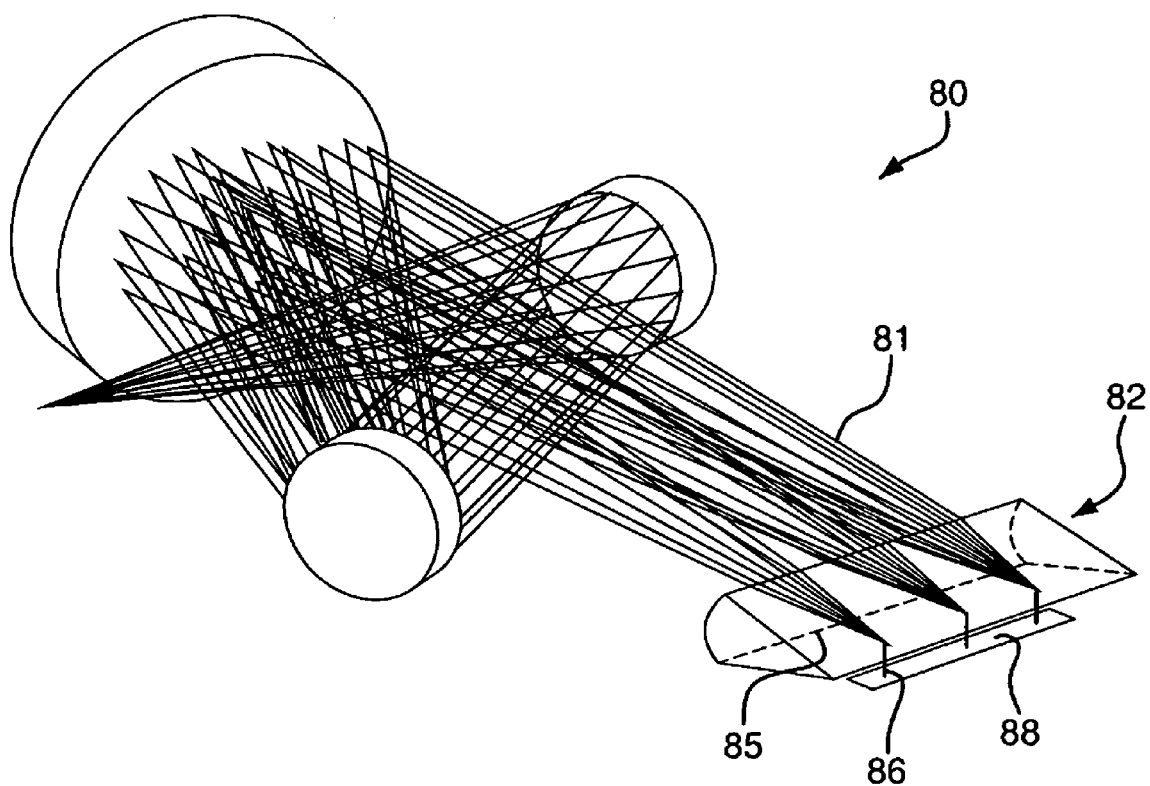
FIG. 5 is a perspective view of a fourth embodiment of a spectrometer.
Figure 5A:
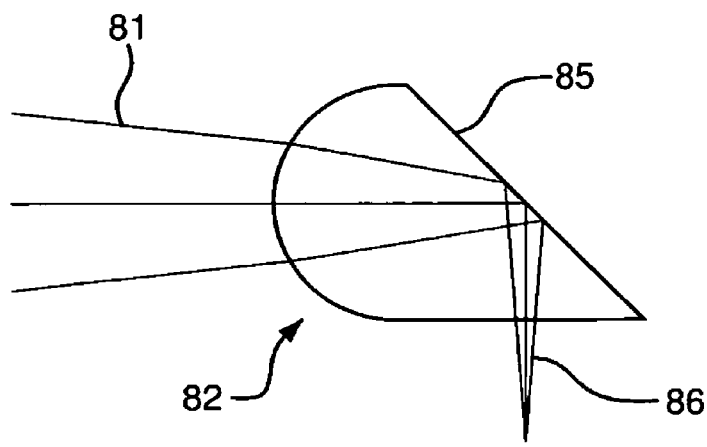
FIG. 5A is an enlarged cross-sectional view of the cylindrical lens in FIG. 5.

Referring now to FIGS. 5 and 5A, a fourth form of spectrometer indicated by the reference numeral 80 is generally similar to the spectrometer 60 shown in FIG. 4, except the cylindrical lens 82 is configured to internally reflect the light beam 81. This is achieved either by total internal reflection on surface 85 or by a reflective coating on surface 85, which is angled so that the beam 81 is reflected as beam 86 out of the main optical plane of the spectrometer. The detector array 88 is appropriately positioned to receive the reflected exit beam 86.

In this embodiment of the invention, the order-sorting filter can be formed on either the curved surface, on the exit surface 84 or the internal reflective surface 85 of the cylindrical lens such as with a multi layer interference coating (reflective order sorting filter). As such, the cylindrical lens would provide astigmatism correction, demagnification, folding (i.e., 90 degree reflection), and order sorting on a single component.

As one illustrative example of suitable dimensions, a lens 50 for use in a Czerny-Turner spectrometer as shown in FIG. 1 can be made of fused silica. The thickness, radius of curvature of the cylinder, material and shape of the wedge, such as the angle of the wedge determine the lens configuration. In one preferred embodiment, the wedge has a length of approximately 32 mm (1.3"). The curved surface 52 might have a radius of 5 mm (0.2"), and the flat face 54 might be at an angle of 5.75° to 6° to the axis of the cylindrical surface, with the cross section tapering from a semicircle at the thick end to a height of approximately 2.23 mm (0.0875") at the thin end. In other words, the wedge shaped cylinder lens has a taper of approximately 5.75° to 6°. A clear aperture of at least 30 mm×3 mm (1.2"×0.12") may be formed on the flat face of the lens. The edges of the lens may be masked off, and may be beveled or otherwise shaped for ease of handling or mounting, or to reduce the scattering of stray light. Exact dimensions for a specific spectrometer may be calculated by known methods, including the use of commercially available optical raytracing software, such as ZEMAX optical system design software, available from ZEMAX Development Corporation, of Bellevue, WA.

Various modifications and variations can be made in the present invention without departing from the spirit or scope of the invention. Thus, it is intended that the present invention cover the modifications and variations of this invention provided they come within the scope of the appended claims and their equivalents.

For example, although the spectrometers described have been referred to as analyzing light of different colors, it should be readily apparent that the light need not be visible light.

Figure 6:
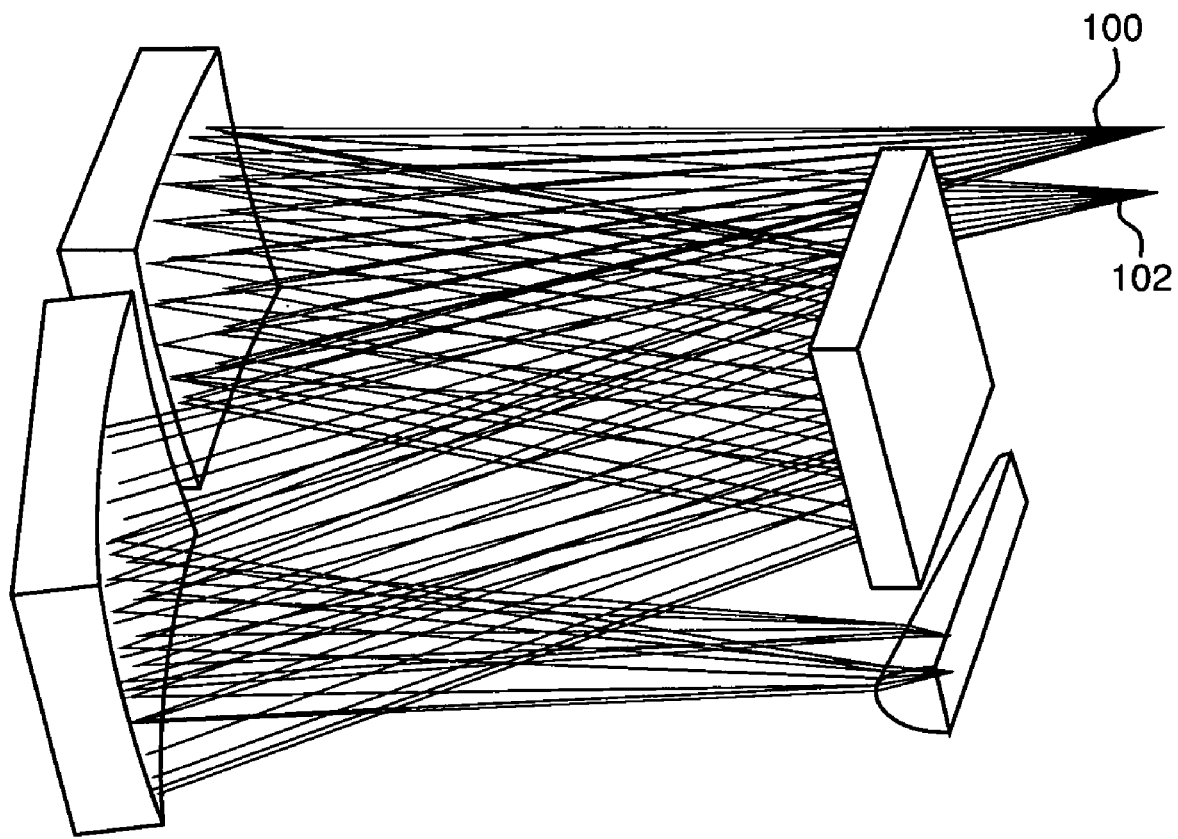
FIG. 6 is a diagrammatic view of a spectrometer embodiment for use in spectroscopy of multiple light sources.

Also, although the spectrometers described above refer to a single light source 12, 62, the spectrometer may, instead, have one or more light sources perpendicular to the meridional plane of the drawings in FIGS. 1 and 3. This is shown in FIG. 6 which depicts two light sources 100, 102. The detector array 32, 70 may then be a two dimensional CCD detector. The use of the cylindrical lens permits spectroscopy on a plurality of light sources in a reduced housing configuration. The refocusing and demagnification allow for close positioned alignment of dispersed light from the different sources on a 2D CCD detector with minimum crosstalk, thus reducing the size of the spectrometer housing significantly. The simultaneous demagnification given by the cylindrical lens allows the use of a smaller size CCD, while keeping the imaging capability, and therefore substantial cost reduction. The present invention can also be used with multiple light sources emitting light both in the plane and perpendicular to the plane (such as multiple columns of light.)

What is claimed is:

1. A spectrometer comprising:
    a housing having an aperture for receiving a beam of light from a light source;
    at least one optical element positioned within the housing for collimating the light beam from the light source, dispersing the light beam into different wavelengths, and focusing the dispersed light toward an elongated detector so that the dispersed light is directed along a length of the detector, wherein the dispersed light that is directed to the detector includes astigmatism; and
    a cylindrical lens located between the at least one optical element and the detector and in the path of the light, the cylindrical lens extending along at least a portion of the detector, the cylindrical lens having a substantially cylindrical face and a substantially flat face, and wherein at least a portion of the cylindrical face is at an angle with respect to the flat face such that at least a portion of the cylindrical lens has a wedge shape, the cylindrical lens adapted to provide substantial astigmatism correction and simultaneously provide substantial demagnification across substantially the entire length of the detector.

2. The spectrometer of claim 1, wherein the at least one optical element includes a collimating mirror for collimating the light beam, a separate dispersive element that separates the collimated light into different wavelengths, and a separate concave mirror that receives the dispersed light and focuses the light toward the detector, the focused light having astigmatism.

3. The spectrometer of claim 1, wherein the at least one optical element includes a concave diffraction grating that provides the collimating, dispersion and focusing of the light beam, the focused light beam including astigmatism.

4. A spectrometer comprising:
    a housing having an aperture for receiving a beam of light from a light source;
    a collimating element that collimates the beam of light received from the light source;
    a dispersive element within the housing and positioned to receive the beam of light, the dispersive element dispersing the beam into different wavelengths;
    a concave element mounted within the housing and arranged to focus the light dispersed by the dispersive element onto an elongated detector so that the light is dispersed in a direction along the length of the detector, wherein the concave element is configured such that the light directed to the detector includes astigmatism; and
    a cylindrical lens located between the concave element and the detector and in the path of the light, the cylindrical lens extending along at least a portion of the detector, the cylindrical lens having a substantially cylindrical face and a substantially flat face, and wherein at least a portion of the cylindrical face is at an angle with respect to the flat face such that at least a portion of the cylindrical lens has a wedge shape, the cylindrical lens adapted to provide substantial astigmatism correction and simultaneously provide substantial demagnification across substantially the entire length of detector.

5. The spectrometer of claim 4, wherein the collimating element and the dispersive element are a grating that is part of the concave element so as to define a concave diffraction grating.

6. The spectrometer of claim 5, wherein the grating includes lines that are spaced non-uniformly to provide astigmatism greater than zero in the dispersed light.

7. The spectrometer of claim 4, wherein the collimating element is a concave collimating mirror located within the housing for receiving the light from the light source and reflecting the light as collimated light, wherein the dispersive element is a substantially flat grating mounted within the housing to receive the collimated light, the grating including spaced apart grooves for dispersing the collimated light into the different wavelengths, and wherein the concave focusing element is located between the dispersive grating and the detector, and wherein the concave element receives a dispersed beam of light from the dispersive grating.

8. The spectrometer of claim 7, wherein the concave focusing element is an aspherical mirror to provide a selected amount of astigmatism in a reflected light.

9. The spectrometer of claim 4, wherein the cylindrical face forms a substantially constant angle with respect to the flat face, and wherein the cylindrical lens is mounted with the flat face substantially parallel to a light receiving surface on the detector.

10. The spectrometer of claim 4, further comprising an order-sorting filter on at least a portion of the cylindrical lens.

11. The spectrometer of claim 4, wherein the cylindrical lens has a flat, internally reflecting surface and is angled to reflect the light from the concave element at an angle to the path of the light received by the cylindrical lens toward the detector by substantially total internal reflection through a reflective coating or a multi layer interference coating.

12. The spectrometer of claim 4, further comprising a plurality of sources of light to be analyzed, spaced apart from one another, and wherein the detector further comprises a plurality of arrays of detector elements positioned to receive the dispersed light of respective ones of the plurality of sources.

13. The spectrometer of claim 12, wherein at least some of the light sources are spaced apart in a direction parallel to the plane in which the dispersive element disperses light.

14. The spectrometer of claim 12, wherein at least some of the light sources are spaced apart in a direction perpendicular to a plane in which the dispersive element disperses light.

15. A spectrometer comprising:
    a housing having an aperture for receiving a beam of light from a light source;
    a concave dispersive element mounted within the housing and arranged to receive the light from the aperture, the concave dispersive element arranged to disperse the light and focus the dispersed light onto an elongated detector so that the light is dispersed in a direction along a length direction of the detector, wherein the light is not fully focused at the detector by the concave dispersive element in a direction perpendicular to the length direction of the detector; and
    a cylindrical lens extending along the length direction of the detector to focus the light at the detector in the direction perpendicular to the length direction of the detector, the cylindrical lens adapted to provide substantial astigmatism correction and simultaneously provide substantial demagnification across substantially the entire length of the detector.

16. The spectrometer of claim 15, wherein the dispersive element is a diffraction grating with uniformly spaced lines.

17. The spectrometer of claim 15, wherein the dispersive element is a diffraction grating with non-uniformly spaced lines.

18. A method of spectroscopy comprising:
receiving a beam of light from an aperture;
collimating the beam of light;
dispersing the beam into different wavelengths using a dispersive element and directing the dispersed light toward a concave element;
focusing the dispersed light with the concave element toward an elongated detector so that the light is dispersed in a direction along a length of the detector, the focused light including astigmatism; and
correcting the astigmatism in substantially all the focused light across the length of the detector and simultaneously demagnifying the focused light across the length of the detector.

19. The method of claim 18 wherein correcting the astigmatism and demagnifiying the focused light across the length of the detector comprises passing the focused light through a wedge-shaped cylindrical lens extending across the length of the detector.

20. The spectrometer of claim 1 wherein the cylindrical lens angle is formed in a plane coincident with the axis of the substantially cylindrical face.

* * * * *